Nov. 1, 1955 P. J. C. CHENUS 2,722,375

MULTIPLYING DEVICES FOR ACCOUNTING MACHINES

Filed May 25, 1951 8 Sheets-Sheet 1

INVENTOR.

BY

Nov. 1, 1955 P. J. C. CHENUS 2,722,375

MULTIPLYING DEVICES FOR ACCOUNTING MACHINES

Filed May 25, 1951 8 Sheets-Sheet 2

INVENTOR.

BY

MULTIPLYING DEVICES FOR ACCOUNTING MACHINES

Filed May 25, 1951 8 Sheets-Sheet 3

INVENTOR.

BY

INVENTOR.

BY

MULTIPLYING DEVICES FOR ACCOUNTING MACHINES

Filed May 25, 1951 8 Sheets-Sheet 5

INVENTOR.

BY

MULTIPLYING DEVICES FOR ACCOUNTING MACHINES

Filed May 25, 1951 8 Sheets-Sheet 6

INVENTOR.

BY

MULTIPLYING DEVICES FOR ACCOUNTING MACHINES

INVENTOR.

BY

Nov. 1, 1955 P. J. C. CHENUS 2,722,375

MULTIPLYING DEVICES FOR ACCOUNTING MACHINES

Filed May 25, 1951 8 Sheets-Sheet 8

| PHASE | COMPONENT | SENSING MR Th | H | T | U | DOUBLING MD | AMOUNT IN MD | | | | TRANSFER TO TP | HTh | TTh | UTh | H | T | U |
|---|---|---|---|---|---|---|---|---|---|---|---|---|---|---|---|---|---|
| I | 1 | | | × | | × | | 9 | 3 | 8 | | | | 9 | 3 | 8 | |
| II(a) | 2 | | (×) | × | | | 1 | 8 | 7 | 6 | | | 1 | 8 | 7 | 6 | |
| II(b) | 2 | | × | (×) | | × | 1 | 8 | 7 | 6 | | 1 | 8 | 7 | 6 | | |
| III | 4 | | | × | | × | 3 | 7 | 5 | 2 | | | 3 | 7 | 5 | 2 | |
| IV | 8 | | | | × | | 7 | 5 | 0 | 4 | | | | 7 | 5 | 0 | 4 |
| | | | | | | | | | | | TOTAL = | 2 | 6 | 0 | 7 | 6 | 4 |

United States Patent Office 2,722,375

Patented Nov. 1, 1955

2,722,375

MULTIPLYING DEVICES FOR ACCOUNTING MACHINES

Pierre Jacques Charles Chenus, Paris, France, assignor to Compagnie des Machines Bull (Societe Anonyme) Paris, France Application May 25, 1951, Serial No. 228,185

Claims priority, application France December 29, 1950

11 Claims. (Cl. 235—61)

Figure 1:
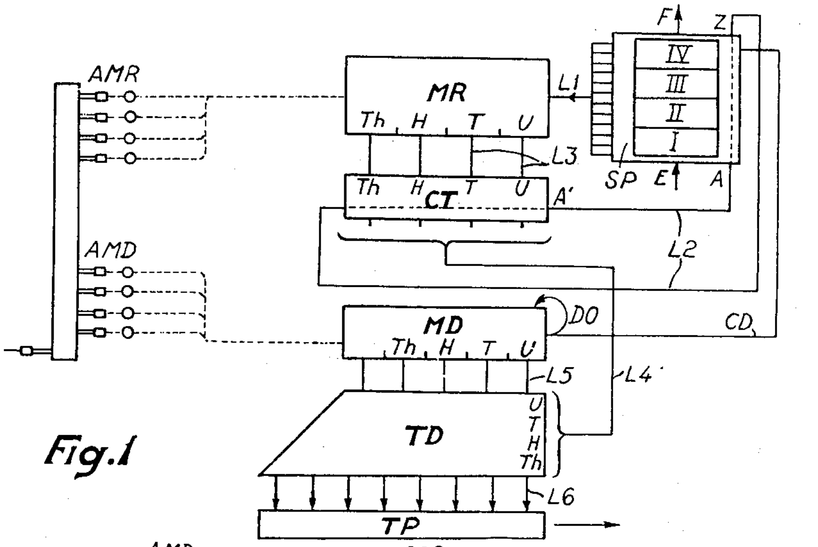

The present invention relates to a multiplication process and to multiplication devices applicable particularly, but not exclusively, to accounting machines, and more particularly to machines controlled by record cards or tapes.

It is a broad object of the invention to provide devices having a suitable speed and possessing a certain flexibility of operation and economy in the manufacture, as compared with known devices.

It is a broad object of the invention to provide a multiplying device which combines a reasonable operating speed with the simplicity of the means employed, by applying a novel multiplication process particularly valuable when the multiplicand factor is registered under decimal form.

This multiplication process consists in:

1. Executing the operation at most in four phases each assigned to a different binary component, from 1 to 8, used as partial multiplier.

2. During the first phase, detecting the multiplier digits whose binary equivalents contain the component binary 1, that is all the odd digits, and transferring successively the multiplicand amount to the product accumulator for each detected digit, with a column shift taking into account, each time, the denominational order of said digit.

3. Doubling the multiplicand in its accumulator at the time of the last transfer of the phase.

4. During the second phase, detecting the multiplier digits whose binary equivalents contain the component binary 2, that is any of the digits 2, 3, 6, 7, and transferring successively the amount in the multiplicand accumulator to the produce accumulator for each detected digit with a column shift taking into account, each time, the order of said digit.

5. Doubling the amount in the multplicand accumulator at the time of the last transfer of the second phase.

6. During the third phase, detecting the multiplier digits whose binary equivalents contain the component binary 4, that is any of the digits 4, 5, 6, 7, and transferring successively the amount in the multiplicand accumulator to the product accumulator as stated before.

7. Doubling the amount in the multiplicand accumulator at the time of the last transfer.

8. During the fourth phase, detecting the multiplier digits containing the component 8, that is either of the digits 8 and 9, and transferring successively the amount in the multiplicand accumulator to the product accumulator as stated before.

Another object of the invention is to provide a multiplying device for applying the above-mentioned multiplication process, in which a multiplication phase may only consist of doubling the amount in the multiplicand accumulator when it is detected that the multiplier digits do not contain the binary component required in that phase.

Another object of the invention is to provide a multiplying device for applying the multiplication process with means to ascertain, each time the amount in the multiplicand accumulator is doubled, whether the multiplier digits contain any of the binary components greater than that required by the phase previously completed, in order to control the stopping of the multiplication operation if the multiplier digits do not contain the greater binary components.

Advantageously, the multiplying device of the invention may readily be incorporated in an automatic accounting machine provided with a cycle controller, registering devices to register the multiplicand and multiplier factors of a multiplication, and a transmitting arrangement or column shift arrangement adapted to transmit sub-products from the multiplicand accumulator to a product accumulator.

In accordance with the invention, in an accounting machine provided with a multiplicand accumulator fitted with single read-out circuits, two column-shift arrangements and two product accumulators, the multiplying device may be adapted, by means of minor adjustments, to carry out the concurrent multiplication of one multiplicand by two multipliers registered in two multiplier registers.

Further, in an accounting machine such as described above, the multiplying device may be adapted, by means of minor adjustments, to separate a registered multiplier into two portions and to carry out the concurrent multiplication of one multiplicand by the two portions of said multiplier, one of the partial products obtained being thereafter combined to the other by transfer with a proper column shift to obtain the final product. This feature permits the operating speed to be substantially increased.

A clearer conception of the operation, construction, and further objects of the invention may be had from the following specification when read in conjunction with the accompanying drawings, in which—

Figure 2:
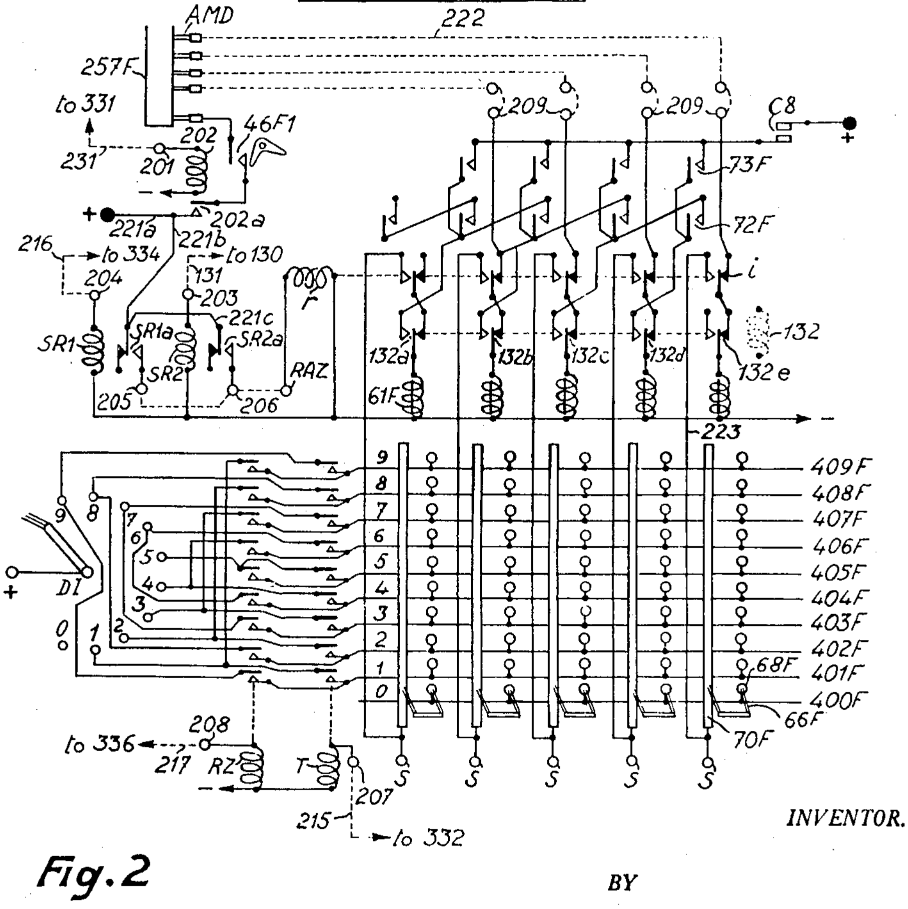

Fig. 1 is a block diagram to illustrate the coordination of the devices in accordance with the invention, Fig. 2 shows the entry and read-out circuits of an electrical accumulator, and associated components.

Figure 3A:
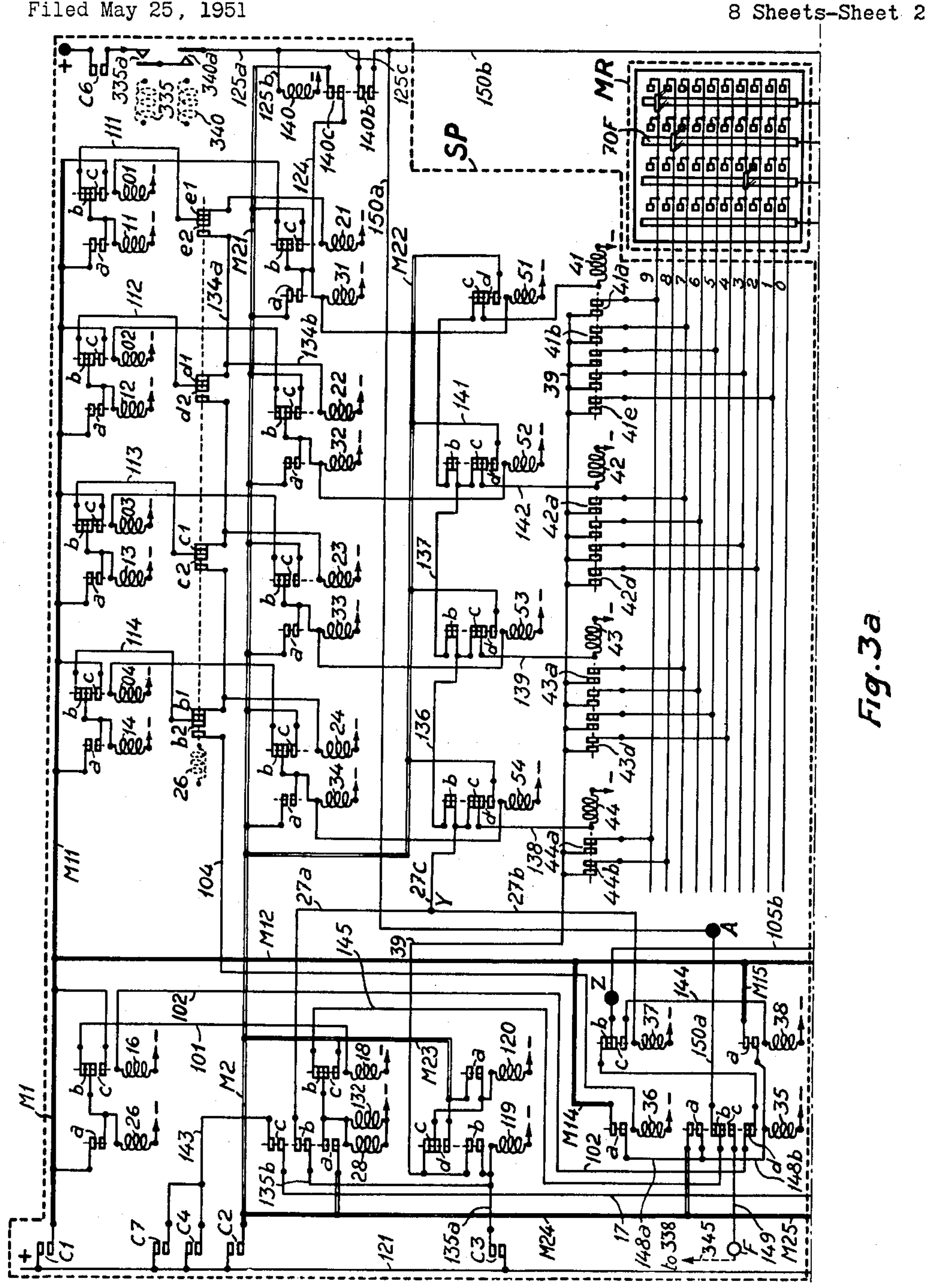
Figure 3B:
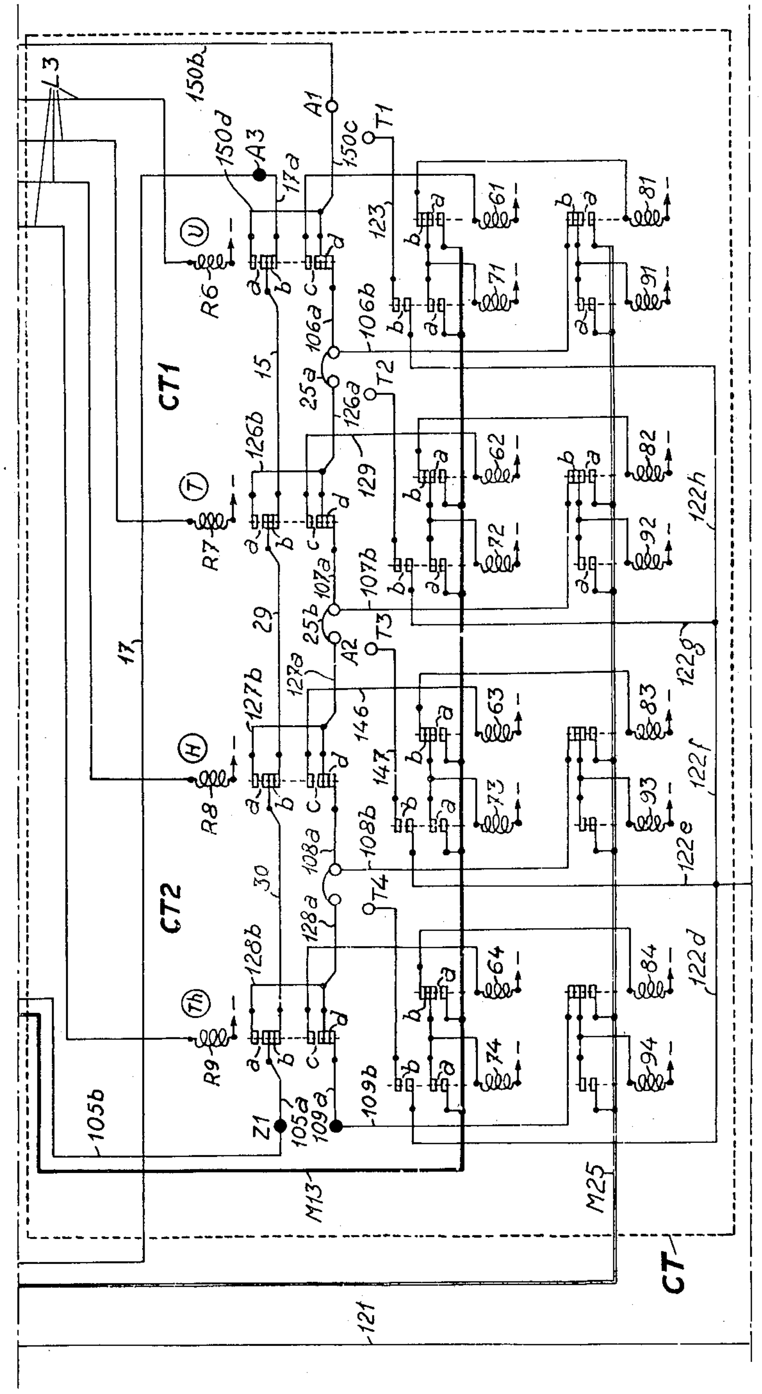
Figure 3C:
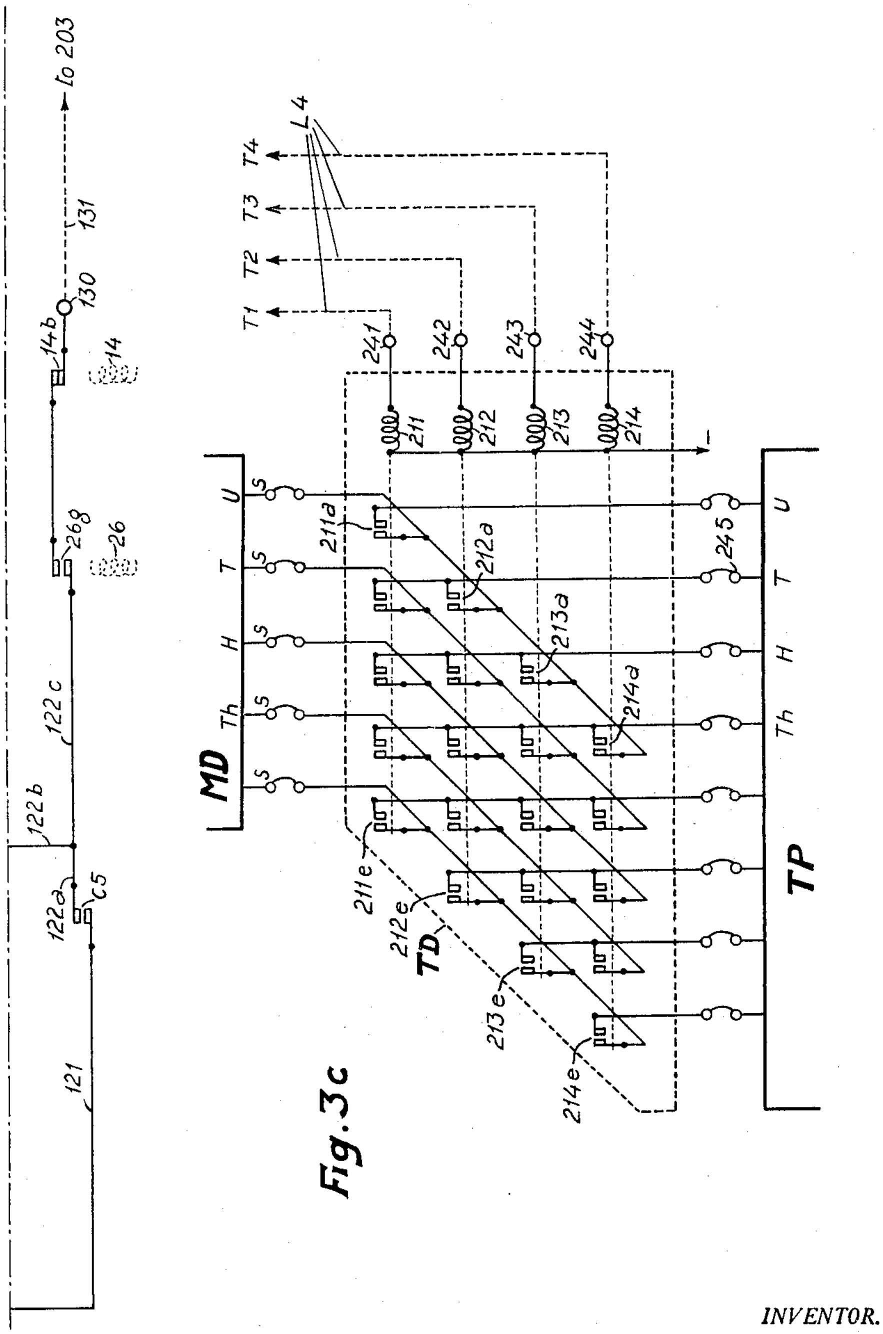
Figures 4, 5:
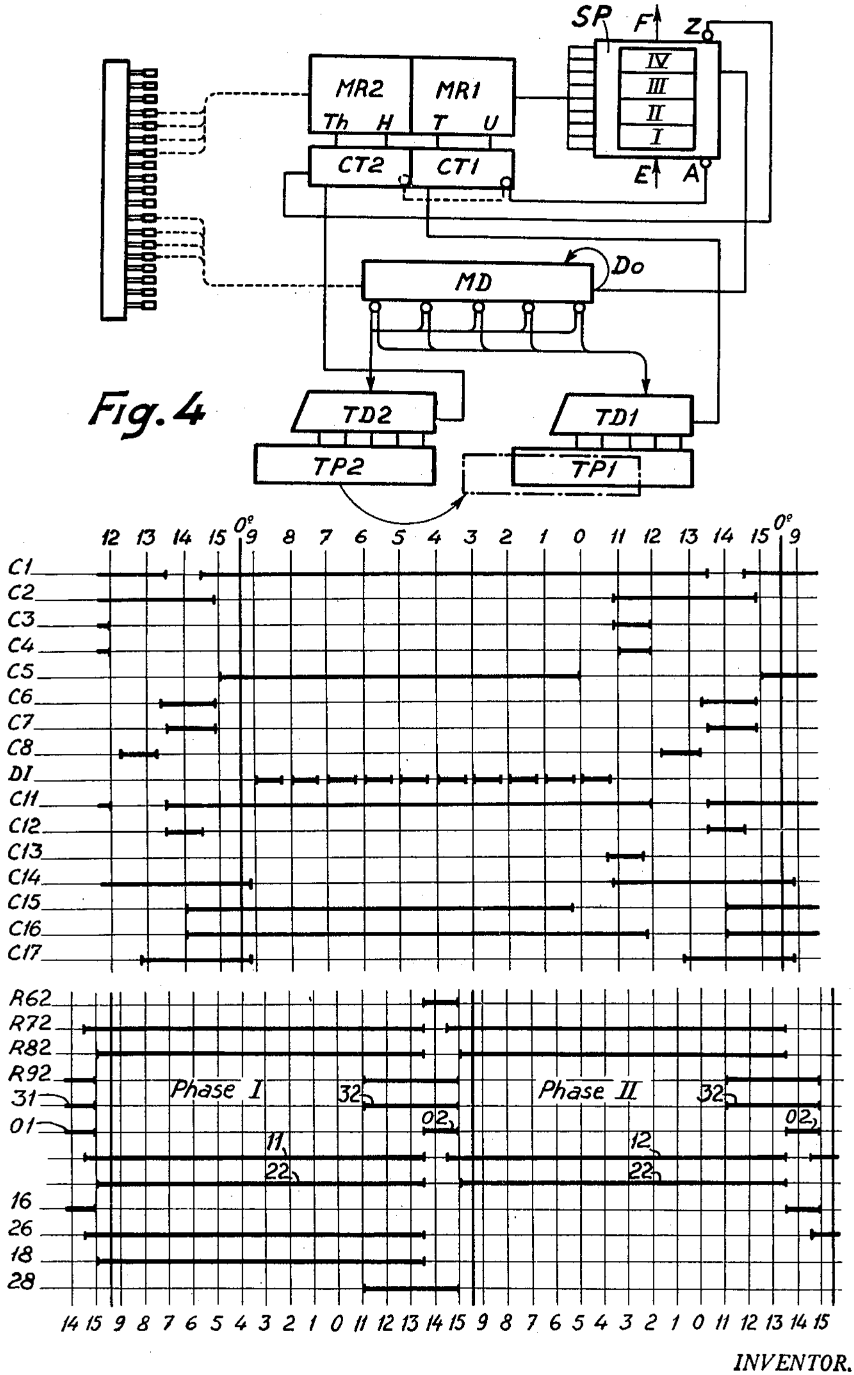

Figs. 3*a*, 3*b*, 3*c* taken together are a schematic circuit diagram of multiplying devices in accordance with the invention, Fig. 4 is a block diagram to illustrate a second combination of the devices in accordance with the invention.

Figure 6:
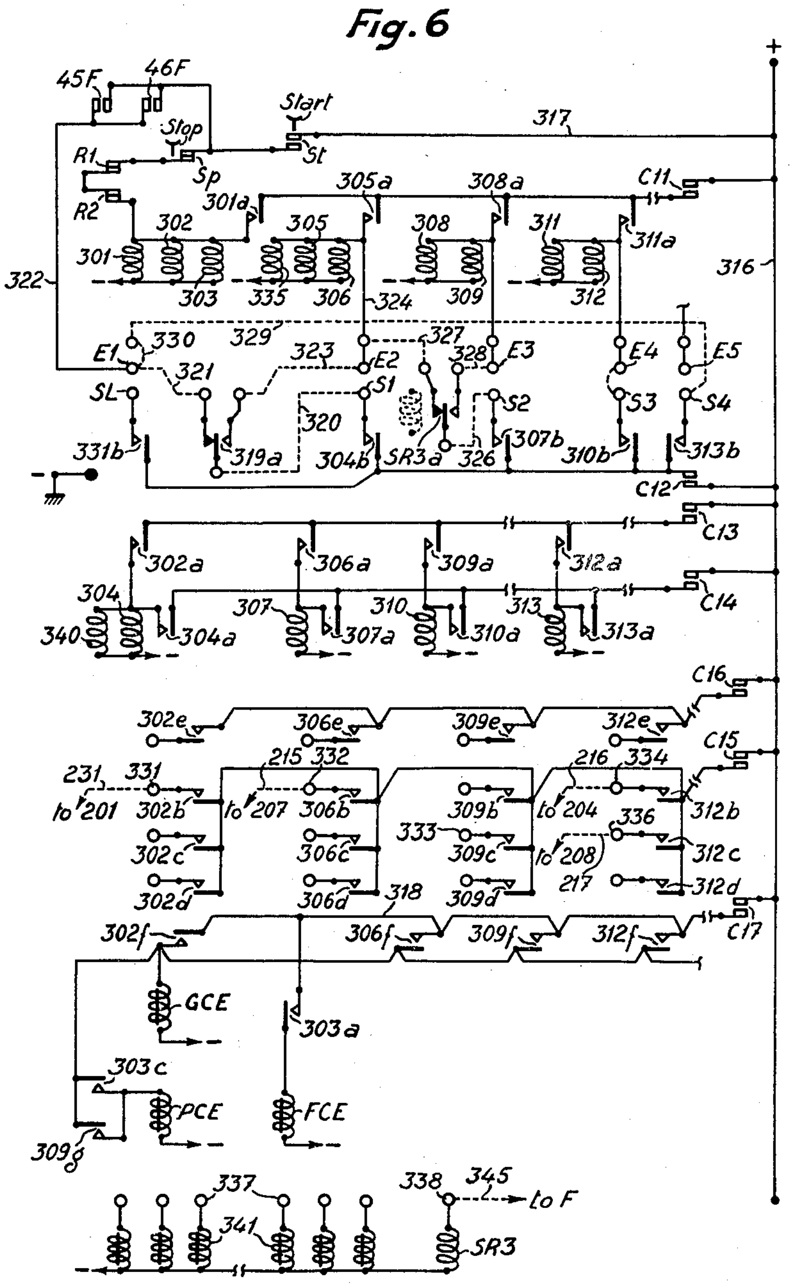
Figure 7:
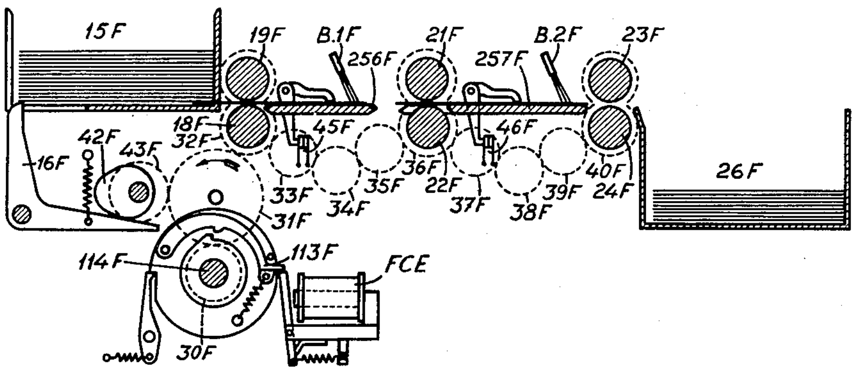
Figure 8:
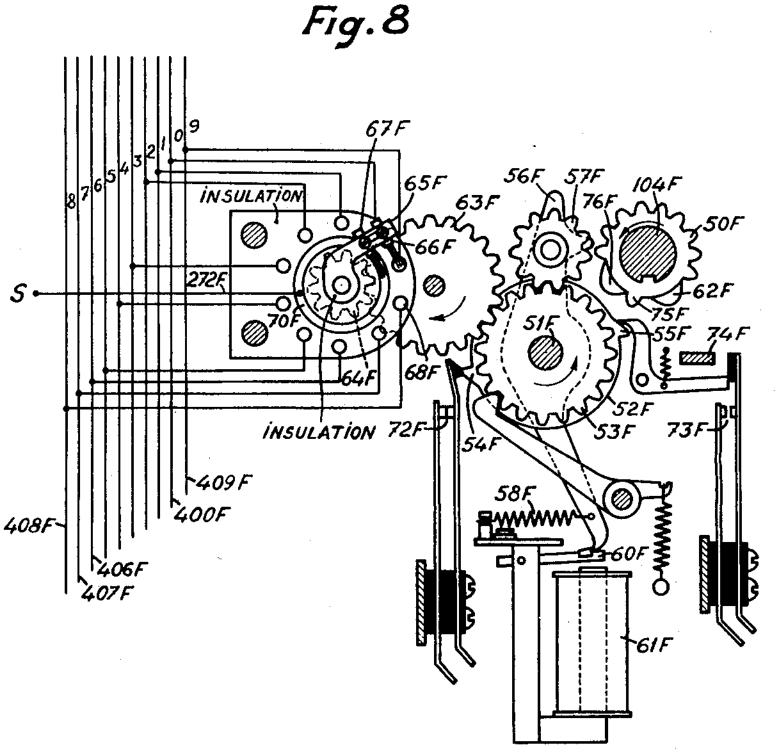
Figures 9, 10:
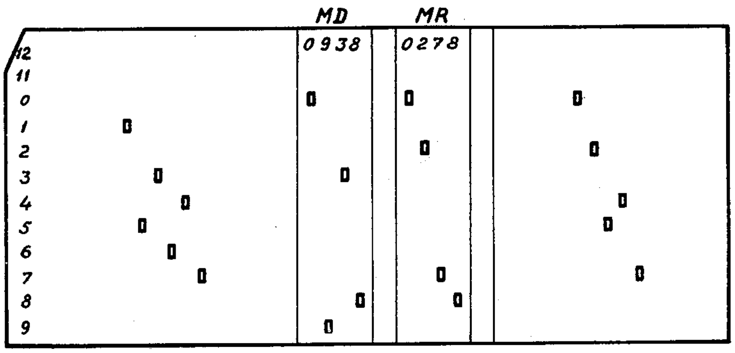

Fig. 5 is a time chart of the operation of cam controlled contacts of a machine in accordance with an embodiment of the invention, Fig. 6 is a circuit diagram illustrating the cycle controller of the machine, Fig. 7 is a longitudinal sectional view of the card feed section of the machine, Fig. 8 is a sectional view of a counter element of an accumulator, Fig. 9 shows an example record card, and Fig. 10 is a table showing the manner in which a typical calculation is effected by the machine.

When the factors of a multiplication consist of decimal digits, the calculation process involves the conversion of these digits into their binary equivalents, as follows:

| Decimal | Binary equivalent |
|---|---|
| 1=1 | (0001) |
| 2=2 | (0010) |
| 3=1+2 | (0011) |
| 4=4 | (0100) |
| 5=1+4 | (0101) |
| 6=2+4 | (0110) |
| 7=1+2+4 | (0111) |
| 8=8 | (1000) |
| 9=1+8 | (1001) |

It is thus possible that the significant digits of the factors be grouped in four groups according to the following:

I. Those including the component 1: 1, 3, 5, 7, 9
II. Those including the component 2: 2, 3, 6, 7
III. Those including the component 4: 4, 5, 6, 7
IV. Those including the component 8: 8, 9

It should be noted that a digit may belong to more than one group.

Similarly, the four successive multiplication phases previously mentioned will be arbitrarily numbered I, II, III and IV and during each phase the digits of the corresponding groups of digits are utilized. For example, the multiplier digits 4, 5, 6, or 7, may be "active" during the phase III, and so on.

During those of the four phases which are necessary for effecting a multiplication, the values of the sub-products transferred from the multiplicand accumulator to the product accumulator will be:

The multiple 1 of the multiplicand, during phase I
The multiple 2 of the multiplicand, during phase II
The multiple 4 of the multiplicand, during phase III, and
The multiple 8 of the multiplicand, during phase IV.

The principle of the invention may be understood with reference to Fig. 1.

The invention is illustrated as embodied in a card controlled machine, such as a well known tabulating machine, which normally comprises:

A card reading section AMD and AMR,
A multiplier register MR,
A multiplicand accumulator MD,
A column-shift arrangement TD,
A product accumulator TP For purposes of the invention, the equipment is also provided with two principal devices:

A phase selector device SP
A transfer control device CT

These devices are connected to each other by means of electrical connections L1, L2, L3, L4, L5, L6 and CD which will be later explained in detail.

Fig. 9 shows a specimen of a punched record card on which is perforated a multiplicand of 938 and a multiplier of 278. These numbers will be taken as the factors of a multiplication example explained with reference to Figs. 10 and 1.

In the example, the factors are inspected by AMD and AMR and entered respectively into registers MD and MR. The multiplier 278 may be analyzed as follows:

| Multiplier: | 2 | 7 | 8 | |
|---|---|---|---|---|
| Component 1: | | × | | Phase I |
| Component 2: | × | × | | Phase II |
| Component 4: | | × | | Phase III |
| Component 8: | | | × | Phase IV |

The operation of the multiplying device is initiated by a starting pulse applied to the phase selector device SP; phase I begins and an inspection is made for the component 1 in the multiplier digits. In Fig. 10, in the zone "sensing MR," a sign × indicates that the digit 7 is determined to contain the component 1. Then, the multiplicand amount is transferred from the accumulator MD to the product accumulator TP. As there is only one odd digit in the multiplier, the multiplicand 938 is doubled in its accumulator to yield the multiple 2 or 1876. The doubling is effected concurrently with the transfer and is symbolized in the zone "Doubling MD," by a sign × and an arrow leading to the next line. Owing to the control exerted by the transfer control device CT on the column-shift arrangement TD, the amount 938 is transferred to TP with a column shift of one order toward the left hand side, as may be seen in the zone "Transfer to TP" (Fig. 10).

During the phase II, the component 2 is searched in the multiplier digits and the digits 2 and 7 are detected as containing this component. During the first cycle of the phase II, the digit 7 is active and the amount 1876 is transferred from MD to TP with a proper column-shift. During the second cycle of the phase II, the digit 2 is active and the amount 1876 is transferred from MD to TP with an appropriate column-shift. At the same time, 1876 is doubled in MD to become 3752 or the multiple 4 of the original multiplicand.

During the phase III, the component 4 is searched in the multiplier digits and the digit 7 is again detected as including the active component; the amount 3752 is therefore transferred from MD to TP with the proper column-shift in accordance with the digit. As there is no other active digit for the phase, the amount in MD is doubled once more to yield the multiple 8 of the original multiplicand or 7504.

During the phase IV, the component 8 is searched in the multiplier digits and the multiplier digit 8 is accordingly active. The amount 7504 is then transferred from MD to TP without column-shift since the multiplier digit 8 is of the units denominational order.

The operation thus ends with the correct total of 260,764 compiled in the product accumulator TP.

In accordance with the preferred embodiment of the invention, as applied to accounting machines, the register or accumulator is of the known decimal totalling type, wherein by known methods, the number contained can be reintroduced. Thus if the totalizer is of the type described in the French Patent 880,929 to Compagnie des Machines Bull (see especially Fig. 4 of this patent), it is sufficient to control total transmitting by means of a connection (see Fig. 6 of the French patent) between the "control" board and the "total-balance"-board and by using jointly the so-called zeroizing relays in order to obtain a multiplication by 2 (this is shown in Fig. 2 of the present invention as connection D*o*).

As the machine embodying the invention may be any electrical tabulating machine well known in the art, only so much of the machine is shown in the present drawings as is necessary to the understanding of the invention and its application thereto.

*Card feed and reading sections*

In the card feed and reading sections shown in Fig. 7, the cards are initially stacked in the card hopper 15F. The driving shaft 114F is arranged to run continuously when coupled to a suitable driving motor. When the card feed clutch electromagnet FCE is energized, its armature releases the clutch lever 113F and the gear 30F is coupled to driving shaft 114F for one revolution or machine cycle. Gear 31F is thus rotated and drives the gears 43F and 32F. Picker 16F is actuated by the rotation of cam 42F integral with the gear 43F. It picks a card and pushes it between feed rollers 18F, 19F. Feed rollers 21F, 22F, 23F, 24F are also driven through gear train 32F—40F.

During the first machine cycle, feed rollers 18F and 19F advance the first card and then stop it with the leading edge under a first reading brush structure B1F. If a second machine cycle is initiated, rollers 18F and 19F, rotating again, advance the first card past the brush structure B1F. The card passes between the roller pair 21F and 22F which stop it with the leading edge under the second brush structure B2F. In the meantime, a second card is picked out of the card hopper. During the third machine cycle, automatically initiated as will be explained later, the first card is moved by rollers 21F and 22F past the second brush structure B2F and is then advanced by rollers 23F and 24F and deposited in the card receptacle 26F. Subsequent cards are fed in the same manner as the first card.

Usually, the machine is adapted to read the data from the cards at the second brush structure B2F.

*Accumulator element*

The structure of an accumulator element is shown in Fig. 8. For each element, a partially toothed gear 50F is keyed on main shaft 104F and runs continuously when coupled with the above cited driving shaft 114F. Two cams 62F and 76F are integral with the gear 50F. In alignment with gear 50F, a totalling wheel 52F is loosely mounted on fixed shaft 51F. A lever 56F, in alignment with cams 62F and 76F is also loosely mounted on the fixed shaft 51F. The totalling wheel 52F comprises a gear 53F and a disc with two diametrically opposite protrusions 54F and 55F. The lever 56F bears a pivot on which is loosely mounted a gear 57F engaging the gear 53F.

During the idle condition of the accumulator, the lower arm of lever 56F is urged clockwise by spring 58F against a lug on the armature 60F of an electro-magnet 61F. When a hole in a card is read, an energization circuit is completed to energize the electro-magnet 61F. Its armature releases lever 56F which rocks and causes gear 57F to engage gear 50F. Consequently, the totalling wheel 52F is rotated by a number of teeth corresponding to the value represented by the hole read. The angular position of wheel 50F on shaft 104F is such that when the zero index position of a card passes brush structure B2F (Fig. 7), the cam 62F engages a lug on the upper arm of lever 56F (Fig. 8), thus returning the lever to its rest position.

Gear 53F may drive, through intermediate gear 63F, a pinion 64F integral with an insulated arm 65F.

The arm 65F bears two brushes 66F and 67F electrically connected to each other, which constitute the settable member of a read-out commutator. The commutator comprises also a common segment 70F and ten numerical segments 68F embedded in an insulating member. For each position of the totalling wheel 52F, brush 66F is in contact with one of the segments 68F. Brush 67F is always in contact with the common segment 70F. In the drawing, brush 66F is shown on the "9" segment, thereby establishing a partial circuit path between wires 409F and 272F.

Either protrusion 54F or 55F closes the contact 72F when the totalling wheel is in the "9" position, and closes the contact 73F when the totalling wheel passes from the "9" position to the "0" position. These contacts are included in the carry transfer circuits as will be explained hereinafter.

Near the end of each machine cycle, the bail 74F reopens the contacts 73F which have eventually been closed. The carry transfer takes place at a time when a card is in the space between brush structures B1F and B2F, that is near the "13" point of the cycle (points will later be explained). When an accumulator element receives a carry, the corresponding electro-magnet 61F is energized by a pulse at the point indicated. Lever 56F rocks so that tooth 75F on gear 50F engages gear 57F. As cam 76F resets the lever 56F to rest position near the "14" point of the cycle, the totalling wheel 52F is turned by one tooth interval, thereby adding one unit to the digit registered by the element.

*Cycle controller and starting circuits*

The machine operates through cycles functionally indepent, each machine cycle being divided, in the present case, into 15 points or intervals. Only a small part of the control circuits is involved with the invention, and this part is shown in Fig. 6 to permit explanation of the starting of the machine into operation and the automatic succession of cycles.

Relay groups 301, 302 and 303, 305 and 306, 308 and 309, and 311 and 312 are four groups among twelve groups which will be designated "1st part" relays. Relays 304, 307, 310, 313 are four relays among twelve relays which will be designated "2nd part" relays. The whole unit is adapted to govern the execution of twelve different typical cycles, and in relation with other control members, the repetition of certain cycles. Reference also may be had to Fig. 5.

It may be pointed out that the dashed lines visible in Fig. 6 represent plug connections on the plugboard of a machine used with the invention. When disposed as shown, these plug connections permit the automatic execution of one cycle A or the card feeding and reading cycle, of a variable number of cycles B or multiplication cycles, of one cycle C or product recording cycle and one cycle D or resetting cycle, for each card being read.

Initially, an operator depresses the start key, thereby completing a circuit from positive terminal +, through wires 316 and 317, closed contacts *St*, *Sp* (Stop Key), R1, R2 normally closed, relay coils 301, 302 and 303 in parallel, to the ground and negative terminal to energize the relays. The contact R1 is opened when the card hopper is empty and R2 is opened when the card receptacle is filled with cards. The closure of contact **302*f* which occurs upon the energization of relay coil 302 causes the establishing of a circuit from positive terminal + through wire 316, cam-contact C17 now closed, wire 318, contact 302F, clutch electro-magnet GCE, to the ground and negative terminal — to actuate electro-magnet GCE. When the clutch is operative, the driving shaft of the machine is coupled with the shaft of an electric motor in operation to initiate a first cycle. At the same time, another circuit is completed from positive terminal +, through wire 316, cam-contact C17, wire 318, contact 303*a* now closed, the card feed clutch electro-magnet FCE, to ground and actuates the electro-magnet FCE. Consequently, a card is fed out of the card hopper during the first machine cycle. The change-over contact 319*a* is under the control of a class number control device (not shown). However, contact 319*a*** cannot be transferred before the third machine cycle of a card run.

During the closure of cam-contact C13, at about the points 11—12 of the cycle, the relay 304 (2d part, cycle A) is energized. The relay 304 holds itself energized through its contact **304*a*** and cam-contact C14.

When cam-contact C12 closes at about the point 14, a circuit is completed which extends from positive terminal +, through wire 316, cam-contact C12, contact **304*b* closed, plug-wire 320, contact 319*a* normal, plug-wire 321, wire 322, card lever contact 45F** closed contacts *Sp*, R1, R2 normally closed, relay coils 301, 302, 303, to ground thereby energizing these relays. The closure of cam-contact C12 constitutes a pulse of cycle end.

The three relays are held energized through contact **301*a* and cam-contact C11 until after the point 13 of the following or second machine cycle. As before, relay 304 is energized during the closure of cam-contact C14. A third machine cycle or cycle A is then initiated, in course of which a first and a second card are read respectively at reading stations B2F and B1F. It is supposed that each card bears a different class number. Consequently the class number control device detects an unequality in class numbers, so that the contact 319*a* is transferred at the moment of the pulse of cycle end. When cam-contact C12 closes, the following circuit is established: positive terminal +, wire 316, cam-contact C12, contact 304*b*, plug socket S1, plug connection 320, contact 319*a* transferred, plug connection 323, plug-socket E2, wire 324, relay coils 305, 306 and 335 to ground. These relays (1st part, cycle B) are thus energized and are maintained in this condition through contact 305*a*** and cam-contact C11.

During the resulting cycle B, the energization of relays 305, 306 and 335 will be followed by the energization of relay 307 (2nd part, cycle B). This sequence of relay energizations may be repeated a certain number of times, as long as contact SR3*a*, controlled by the selection relay SR3, remains in normal position. Selection relay SR3 is under control of the multiplication devices as will be explained.

When, near the end of a cycle B, contact SR3*a* is transferred, the pulse of cycle end is sent to relays 308, 309 thereby initiating one cycle C. Near the end of this cycle C, the energization of relay 310 and the closure of contact 310*b* causes the pulse of cycle end to be sent to relays 311, 312, thereby initiating one cycle D. Near the end of said cycle D, the energization of relay 313 and closure of contact 313*b*, causes the pulse of cycle end to be sent through plug-connection 329 and wire 322 to the relay group 301, 302 and 303, thereby initiating another cycle A. As contact 319*a* is transferred during this cycle, a succession of cycles B follows the cycle A, and the same sequence of events as has been described is repeated.

It is readily seen that during any cycle A, the plug-sockets 331 are connected to a voltage while cam-contact C15 is closed; that during any cycle B, the plug-sockets 332 are connected to a voltage; that during any cycle C, plug-sockets 333 are connected to a voltage; that during any cycle D plug-sockets 334 and 336 are connected to a voltage, all of which permits the supplying of the voltage to various execution members as will be later shown.

It is seen, as well, that the general clutch electro-magnet GCE may be energized during any cycle through one of the contacts 302*f*, 306*f*, 309*f*, 312*f*, etc. and that the printing clutch electro-magnet PCE can be energized during either of cycles A or C.

The lower part of Fig. 6 shows the printing electro-magnets 341 each connected to a plug-socket 337. Additional details with reference to the printing mechanism may be had by reference to U. S. Patent 2,046,465, dated July 7, 1936, and issued to K. A. Knutsen. The printing mechanism is of the type in which each electromagnet can receive a timed pulse to print a digit character on a paper strip during a printing cycle.

*Accumulator circuits*

In Fig. 2, are shown the previously mentioned members of an accumulator, namely: contacts 73F, 72F, entry electro-magnets 61F, common segments 70F and numerical segments 68F, brushes 66F, wires 400F—409F. By way of example, Fig. 2 represents the MD accumulator which may receive a four-digit number. The four entry terminals 209 are connected through plug-connections 222 to the reading section AMD.

The contacts *i*, controlled by relay *r*, are normally transferred during the points 9 to 0 of any resetting cycle or cycle D.

From one to four reading circuits may be completed during a cycle A, when a card passes the AMD station, due to the closing of card lever contact 46F1 and contact 202*a*. Relay 202 is energized during cycle A owing to the plug connection between plug-socket 201 (Fig. 2) and plug socket 331 (Fig. 6).

Upon entry of a multiplicand amount, if for example, a hole is read at the Units denominational order, the entry circuits is as follows: terminal + (Fig. 2, left), wire 221*a*, contacts 202*a*, 46F1 closed, a common brush, conducting platen 257F, the card hole, the upper brush, plug-connection 222, plug-socket 209, contacts *i* and 132*e* normal, the coil of electro-magnet 61F to the negative terminal.

For transferring a number set on the read-out commutators, the closing of contacts controlled by relay T, during any cycle B, permits the numerical segments 68F to receive timed pulses emitted by the pulse distributor DI. The pulses corresponding to the number appear on exit terminals S. The energization of relay T results from the plug-connection 215 between plug-sockets 207 (Fig. 2) and 332 (Fig. 6).

In a manner well known in the art, the energizing of circuits by the closing of the contacts controlled by relay RZ (Fig. 2) permits, during any cycle D, the resetting of the accumulator by the method of tens complements. The energization of relay RZ results from the plug-connection 217 between plug-sockets 208 (Fig. 2) and 336 (Fig. 6). A tens-complement pulse appearing on an exit terminal S is then transmitted through a wire 223 (Fig. 2) for instance, contact *i* transferred, contact 132*e* normal, to the corresponding entry electro-magnet 61F.

During any cycle D, the selection relay SR1 is energized, due to the plug-connection 216 between plug-sockets 204 (Fig. 2) and 334 (Fig. 6). A circuit is thus completed from terminal + (Fig. 2, left), through wires 221*a*, 221*b*, contact SR1*a* transferred, plug-connections connecting plug-sockets 205, 206, RAZ and relay coil *r*, to terminal — thus energizing the relay.

According to a known method for doubling an amount registered in this accumulator, relays T and *r* may be energized simultaneously. A true pulse appearing on a terminal S, follows the circuit path including a wire 223 and is introduced in the corresponding electro-magnet 61F. A further control of relay *r*, as also the control of relay 132, will be explained in relation with the examination of the multiplying devices.

*Multiplying devices*

The multiplying devices are shown in Figs. 3*a*–*c*. The phase selector device SP (Fig. 3*a*) essentially comprises four groups of four relays, each group being assigned to control the execution of a different multiplication phase, namely:

Phase I: relay group 01, 11, 21, 31
Phase II: relay group 02, 12, 22, 32
Phase III: relay group 03, 13, 23, 33
Phase IV: relay group 04, 14, 24, 34

Two holding lines M1 and M2, respectively fed by cam-contacts C1 and C2, supply the various relay groups with current.

In Fig. 3*a*, lower right hand corner, four read-out commutators of the multiplier register MR are represented in a rectangle in dotted lines. The numerical segments thereof are connected together to lines 9 to 0. The common segments are separately connected through wires such as L3 (Fig. 3*b*) to detection relay R6—R9, each relay being assigned to a different denominational order.

The unit comprising cam contact C3 (Fig. 3*a*), wire 39, and contacts controlled by relays 41—44 constitutes a multiplier sensing device in association with said relays R6—R9.

Relays 51, 52, 53 and 54 (Fig. 3*a*), respectively in parallel wih relays 31, 32, 33 and 34, are used to select, according to the multiplication phase in process, the binary component to be searched in the digits of the registered multiplier, namely:

Phase I—binary component: 1—relay 51
Phase II—binary component: 2—relay 52
Phase III—binary component: 4—relay 53
Phase IV—binary component: 8—relay 54

The doubling control device comprises the relay group 16, 18, 26 and 28 (Fig. 3*a*) and controls the doubling of the amount registered in the multiplicand accumulator and also the phase sequence.

The relay group 35, 36, 37 and 38 is provided to detect the end of a multiplication operation and to furnish an order to the cycle controller of the machine.

The transfer control device CT (Fig. 3*b*) essentially comprises four groups of four relays, namely:

Units denominational order: relays 61, 71, 81, 91
Tens denominational order: relays 62, 72, 82, 92
Hundred denominational order: relays 63, 73, 83, 93
Thousand denominational order: relays 64, 74, 84, 94

The column-shift arrangement TD is represented in Fig. 3*c*, its circuits being disposed between the exit terminals S of the multiplicand accumulator MD and the entry terminals 245 of the product accumulator TP. Relays 211, 212, 213, 214 are column-shift control relays each being connected through plug-wires L4 to plug-sockets T1—T4 in the transfer control device CT.

Assuming for example that, during the phase I, for instance, the relay group 61, 71, 81, 91 is made operative, a circuit is completed during the closure of cam-contact C5 which extends from positive terminal + (Fig. 3*a*, upper left hand corner), wire 121 (Fig. 3*a*, 3*b*, 3*c*), cam-contact C5, wires 122*a*, 122*b*, 122*f* (Fig. 3*b*), 122*h*, contact 71*b* closed, wire 123, plug-socket T1, one of the plug-wires L4, plug socket 241, relay coil 211, to negative terminal — thereby energizing the relay.

Consequently contacts 211*a*–211*e* are closed from the "9" point to the "0" point of the cycle and permit the transmission of sub-product pulses from MD to TP without column-shift.

Other circuits will be examined when explaining the general operation.

*General operation*

The operation of the multiplying devices will be explained with help of an illustrative example.

The operation is considered as beginning with a cycle A, in the course of which a card as shown by Fig. 9 is read at the reading station B2F. From the foregoing, it is clear how the multiplicand 938 and multiplier 278 are respectively entered in the accumulator MD and register MR, during the first part of said cycle.

The relay 304 (2d part, cycle A) and relay 340 (Fig. 6) are energized from the point 11 (cycle A) to the point 9 of the following cycle or cycle B1. Relays 305 (1st part cycle B), 306 and 335 are energized through cam-contact C11 from the point 14.5, cycle A to point 13.5 on the following cycle or cycle B1.

There is a moment, near the end of cycle A, when contacts 335*a* and 340*a* (Fig. 3*a*) are simultaneously closed and this is from point 13.5 on cycle A to point 9 on cycle B1.

The starting of the phase selector device SP results from a starting pulse supplied by cam-contact C6 through contacts 335*a*, 340*a* closed to relay 140. The closure time of cam-contact C6 (Fig. 5) gives the pulse duration. At this time, the closure of contact 140*c* causes the completion of the circuit: positive terminal + (Fig. 3*a*, left hand corner) wire 121, cam-contact C2, lines M2, M21, contact 140*c* closed, wire 124, relay coil 31, to negative terminal —. This energizes the holding relay 31 and initiates the phase I. Relay 31 holds itself energized through its contact 31*a* and line M21 until the point 15 of the cycle A.

The pick-up relay 01 is energized at the same time as relay 31 because of contact 21*bc* in normal position (see Fig. 5 lower part). With contact 01*bc* transferred, the holding relay 11 becomes energized upon closure of cam contact C1, that is at point 14.5 of cycle A. It holds itself energized through its contact 11*a* and line M1, M11, until point 13.5 of cycle V1.

At point 15 of cycle A, when relay 01 is deenergized, relay 26 is energized in a manner to be explained presently and contact 26*e*1, *e*2 is transferred. A circuit is thus completed extending from positive terminal + (Fig. 3*a*, left hand corner), through cam-contact C1, line M1, M11, contact 11*a* closed, contact 01*bc* normal, wire 111, contact 26*e*1, *e*2 transferred, wires 134*a*, 134*b*, relay coil 22, to the negative terminal. It will be understood that, from the very beginning of the phase I, the pick-up relay 22 (phase II group) is energized.

Relay 51 is energized at the same time as relay 31 and when contact 51*cd* is transferred, relay 41 is energized through cam-contact C2, wires M2, M22 and contact 51*cd* transferred.

The wire 39 (Fig. 3*a*) is connected to a voltage source from point 11 to point 15 of each cycle. Cam-contact C3 energizes the pick-up relay 119, which closes its contact 119*b*, and transfers its contact 119*cd* resulting in the completion of the circuit path: positive terminal +, cam-contact C2, lines M2, M23, contact 119*cd* transferred, relay coil 120, to the negative terminal — thereby energizing this relay. Relay 120 is held energized through its contact 120*a* and line M23. After point 12, when contact 119*cd* returns to normal position, line 39 is connected to line M23 through contacts 120*a* and 119*cd*.

During closure of contacts 41*a*—41*e*, from point 13.5 to point 15, the sensing of the multiplier digits occurs. This event marks the beginning of the multiplication phase I. As only the digit 7 of the multiplier digits, contains the binary component 1, only one circuit is completed as follows: positive terminal + (Fig. 3*a*, left hand corner), wire 121, cam-contact C2, line M2, M23, contact 120*a* closed, contact 119*cd* normal, wire 39, contact 41*b*, line 7, numerical segment 7 of the tens denominational order, the settable brush, common segment 70F, wire L3 of the tens order, relay coil R7, to negative terminal —, which energizes the relay R7. Contacts R7*ab* and *cd* are thus transferred. The transfer of said contacts has two effects:

1. The completion of one determination circuit path extending from positive terminal + (Fig. 3*a*, right hand corner), through cam-contact C6, contacts 335*a*, 340*a* closed, wires 125*a*, 125*c*, contact 140*b* closed, wires 150*b* (Figs. 3*a*, 3*b*), 150*c*, contact R6*cd* normal, wire 106*a*, two-prong connector 25*a*, wires 126*a*, 126*b*, contact R7*ab* transferred, wire 29 contact R8*ab* normal, wire 30, contact R9*ab* normal, wires 105*a*, 105*b* (Figs. 3*b*, 3*a*) contact 37*bc* normal, contact 35*d* normally closed, wire 102, relay coil 16, to the negative terminal. The pick-up relay of the doubling control device is thus energized.

It may be seen that, when there are active multiplier digits (as in the phase I, for example), the partial determination circuit between points A1 and Z1 (Fig. 3*b*) will be completed if only one active digit is detected, but not at once if there is more than one active digit detected.

2. From wire 126*a* (Fig. 3*b*) a branch circuit is completed through contact R7*cd* transferred, wire 129, to relay coil 62 and negative terminal—thus energizing the tens order group of the transfer control device.

With contact 62*ab* transferred, holding relay 72 becomes energized at point 14.5 on the cycle A and holds itself energized through its contact 72*a*, and line M13, until point 13.5 on the following cycle B1. When at point 15 on the cycle A, contact 62*ab* returns to normal position, the pick-up relay 82 is energized through line M13, contact 72*a* closed, contact 62*ab* normal, wire 134, until the opening of cam-contact C1. In course of cycle B1, contact 82*ab* being transferred, holding relay 92 can be energized upon closure of cam-contact C2, the circuit being: positive terminal + (Fig. 3*a*), wire 121, cam contact C2, line M25 (Figs. 3*a*, 3*b*), contact 82*ab* transferred, relay coil 92 to the negative terminal. Relay 92 holds itself energized through its contact 92*a* and cam-contact C2, until point 15 of the cycle B1. When relay 82 is deenergized, at point 13.5 on cycle B1, a voltage pulse appears on wire 107*b* and lasts until point 15 when relay 92 is deenergized. This pulse is transmitted through branch circuits to relay 93 and 94 without effect since there is only one active digit for the phase I.

The sequential energization of a relay group of the transfer control device has just been stated. During the first part of the cycle B1, that is the closure time of cam-contact C5, a circuit is completed from positive terminal +, (Fig. 3*a*, left hand corner), wire 121 (Figs. 3*a*, 3*b*, 3*c*), cam-contact C5, wires 122*a*, 122*b*, 122*f*, 122*g*, contact 72*b* closed, plug-socket T2, one of the plug-wires L4, plug-socket 242, to relay coil 212 and negative terminal —, energizing the relay. As the relay T (Fig. 2) is energized at the same time, the multiplicand amount 938 may be read-out, the representative pulses appearing at exit terminals S (Figs. 2 and 3*c*). Due to the closure of contacts **212*a*—212*e*** the amount is transferred from the accumulator MD to the accumulator TP with a single column-shift to the left.

Returning to the operation of the doubling control device, Fig. 5 (lower part) shows that the sequential energization of relay group 16, 26, 18 and 28 (Fig. 3*a*) is the same as that of the relay group 62, 72, 82 and 92, examined before.

During energization of relay 26 (first part of cycle B1), contact **26*g*** (Fig. 3*c*) is closed. From cam-contact C5, a circuit continues through wires **122*a*, 122*c*, contact 14*b* normally closed, plug-socket 13*c*, plug-wire 131** (Figs. 3*c* and 2) plug-socket 203, selection relay coil SR2 to negative terminal — energizing the relay. The transfer of contact SR2*a* permits the completion of the circuit: positive terminal + (Fig. 2), wires **221*a*, 221*b*, 221*c***, contact SR2*a*, plug-wire between plug-sockets 206 and RAZ, relay coil *r*, to negative terminal —, which energizes the relay. In the manner described before, the transfer of contacts *i* causes the true timed pulses appearing at the terminals S to be reentered into the accumulator MD. The multiplicand amount 938 becomes 866 during points 9–0 of the cycle B1. As the totalling wheels of the hundred and units orders have passed from 9 to 0, corresponding contacts **73*f* are closed when cam-contact C8 closes near the point 13, to effect the tens carry overs. Relay 132** (Figs. 2, 3*a*), in parallel with relay 28, is energized at this time (see Fig. 5). By means of contacts **132*b* and 132*d*** transferred, a carry is entered at the thousand and tens orders, the amount registered becoming 1876.

The energization of relay 28 at the final part of cycle B1 indicates that the amount initially in the accumulator MD was just doubled in the first part of the cycle, and that, in the present case, the phase I requires only one multiplication cycle B.

From the end of the first cycle of the phase I, a presensing of the multiplier digits is effected each cycle to search for the binary components greater than the component assigned to the phase in progress. As a matter of fact, the components 2, 4 and 8 are searched for as explained hereinafter.

At the point 11 on the cycle B1, due to the transferred position of contact **22*bc*, the holding relay 32 and relay 52 are energized during closure of cam-contact C2. Relay 28, being energized as previously noted, closes contacts 28*b* and 28*c* during the same period. The time for the pre-sensing is delimited between points 11 and 12 by the closure time of cam-contact C3; wire 27*a*** thus carrying a voltage during this time. From point Y (Fig. 3*a*) several branch circuits are completed: (1) relay 37 is energized through wire **27*b*; (2) relay 44 is energized through wire 27*c*, contact 54*cd* normal, wire 138; (3) relay 43 is energized through wire 27*c*, contact 54*b* normally closed, wire 136, contact 53*cd* normal and wire 139. Relay 42 is also energized at the same time as relay 52, its energization circuit being from line M22, through wire 141, contact 52*cd* transferred, wire 142 and relay coil 42**, to the negative terminal.

As the components 2, 4, 8 are present in the digits of the registered multiplier 278, and because line 39 carries a voltage from point 11 to point 15, relays R6, R7 and R8 will be energized during the concurrent closure of contacts **44*a*—44*b*, 43*a*—43*d* and 42*a*—42*d***, and contacts R8*ab*, R7*ab* and R6*ab* will be transferred. If none of the contacts R9*ab*–R6*ab* were transferred, a determination circuit could be completed. It could extend from positive terminal + (Fig. 3*a*, left hand corner), through wire 121, cam-contact C4, wire 143, contact **28*c* closed, wire 17** (Figs. 3*a* and 3*b*), contact R6*ab* normal, wire 15, contact R7*ab* normal, wire 29, contact R8*ab* normal, wire 30, contact R9*ab* normal, wires **105*a*, 105*b*** (Figs. 3*b* and 3*a*), contact **37*cb* transferred, wire 144, relay coil 38 to negative terminal —. The eventual energization of relay 38** can result a little later in the stoppage of the multiplication process, as will be explained.

At the end of the cycle B1, that is from point 13.5 to point 15, relay 42 remains energized and the normal sensing of the multiplier digits takes place to search the binary component 2. As the binary component 2 is present in the digits 2 and 7 in the multiplier 278, relays R7 and R8 are energized during this time. When at point 13.5 of the cycle relay 18 is deenergized, its contact **18*bc*** returns to normal position.

A circuit is thus completed as follows: positive terminal + wire 121, cam-contact C2, line M24, contact **28*a* closed, contact 18*bc* normal, wire 145, contact 35*bc* normal, wires 150*a*, 150*b*, 150*c*** (Figs. 3*a* and 3*b*), contact R6*cd* normal, two-prong connector **25*a*, wire 126*a***, contact R7*cd* transferred, wire 129, relay coil 62, to negative terminal —, which energizes the relay. Thus the tens order group of the transfer control device is again set into operation and the energization sequence is as previously stated to permit the transfer of the amount 1876 from accumulator MD to accumulator TP during the following cycle B2.

Holding relay 91 is energized at the same time as relay 62 from wire **106*a*, through wire 106*b*, and contact 81*ab*** normal; but this energization is of no consequence. Besides, the partial determination circuit between points A1 and Z1 cannot be completed at the end of the cycle B1, since there is more than one contact transferred, namely R7*ab* and R8*ab*, and the doubling control device is not set into operation.

With reference to Fig. 5 (lower part) it may be seen that the operation of a relay group of the phase selector device SP (for instance, the group 22, 32, 02 and 12) extends over two cycles. As relays 32, 52 and 42 are energized at the end of the cycle B2, the sensing of the multiplier digits results in the energization of detection relays R7 and R8, as during the preceding cycle.

At point 13.5 of the cycle B2, relay 82 is deenergized. The return of contact **82*ab* into normal position produces a pulse transmitted to relay 63, the complete circuit being: positive terminal +, wire 121**, cam-contact C2, line M25 (Figs. 3*a* and 3*b*) contact **92*a* closed, contact 82*ab* normal, wire 107*b*, two-prong connector 25*b*, wire 127*a***, contact R8*cd* transferred, wire 146, relay coil 63 to negative terminal —. Thus the hundreds order relay group of the transfer control device is set into operation.

Thus pulse finds another circuit from wire **127*a*, through wire 127*b***, contact R8*ab* transferred, wire 30, contact R9*ab* normal, wires **105*a*, 105*b*, contact 37*bc* normal, contact 35*d* normally closed, wire 102, relay coil 16**, to negative terminal — and energizes the relay. Thus, the doubling control device is set into operation.

During the first part of cycle B3, that is the second cycle of the phase II, a circuit is completed as follows: from cam-contact C5 (Fig. 3*c*) through wires **122*a*, 122*b*** (Figs. 3*c* and 3*b*) wire **122*e*, contact 73*b* closed, wire 147**, plug socket T3, one of the plug wires L4 (Figs. 3*b* and 3*c*), plug-socket 243, relay coil 213 to negative terminal — thus energizing the relay.

Consequently, the amount 1876 is transferred, in the manner previously shown, from accumulator MD to accumulator TP with a column-shift of two ranks towards the left.

During that time, the amount 1876 is doubled in MD as previously shown to yield the amount 3,752.

At points 11–12 of the cycle B3, the pre-sensing of the multiplier digits manifests the presence of components 4 and 8 at the tens and units orders and the necessity of further cycles.

At points 13.5–15 of the cycle B3, the phase III is initiated due to energization of the pick-up relay 23 from the point 15 of the cycle B2, followed by the sequential energization relays 33 and 03. As relays 53 and 43 are energized concurrently with relay 33, the sensing of the multiplier digits results in the detection of the digit 7 as containing the component 4 in the tens order. Accordingly, the detection relay R7 is again energized. As there is only one contact transferred in the determination circuit between points A1 and Z1, relay 16 is energized to set the doubling control device into activity. Moreover, contact R7*cd* transferred causes the energization of relay 62, setting into activity the tens order relay group of the transfer control device.

During the first part of the following cycle or cycle B4 (phase III), relay 212 is energized as previously shown to control the transfer of the amount 3,752 from accumulator MD to accumulator TP with a column shift of one rank to the left. During that time, the amount 3,752 is doubled in MD to yield the amount 7,504.

At points 11–12 of the cycle B4, the pre-sensing of the multiplier digits determines the presence of the component 8 in the digits and the necessity of at least one further cycle.

It is useful to consider the operation of the phase IV relay group in the phase selector device at the end of cycle B4. Relay 34 is energized from point 11 to point 15. Relay 04 is energized from point 13.5 to point 15. Relay 14 is energized from point 14.5.

Relays 54 and 44 are energized at the same time as relay 34 to control the search of the component 8 in the multiplier digits. Relay R6 detects that the component 8 is present at the units order of the multiplier. As there is only one contact transferred in the determination circuit between points A1 and Z1, relay 16 is energized to set the doubling control device into activity. Moreover, contact R6*cd* transferred causes the energization of relay 61, setting into activity the units order relay group of the transfer control device.

During the first part of the following cycle or cycle B5 (phase IV), relay 211 is energized, in a manner now clear, to control the transfer of the amount 7,504 from accumulator MD to accumulator TP.

But this time, although relays 26 and 28 are energized, it is not desirable to actually double the amount in accumulator MD, since the multiple 16 of the original multiplicand is not used. To this end, contact 14*b*, controlled by relay 14, is inserted in series in the circuit including contact 26*g* (Fig. 3*c*), so that relay *r* (Fig. 2) is not energized during the transfer of the amount 7,504.

The determination of the end of the operation results from the following events. Contact 26*b*1, *b*2 (Fig. 3*a*) is transferred from the point 14.5 of the cycle B4. When, at point 15 of this cycle, contact 04*bc* returns to normal position, the following circuit is completed: from positive terminal + (Fig. 3*a*, left hand corner), cam contact C1, line M1, M11, contact 14*a* closed, contact 04*bc* normal, wire 114, contact 26*b*1, *b*2 transferred, wire 104, relay coil 36 to negative terminal —, energizing the relay until point 13.5 of cycle B5. As soon as contact 36*a* is closed, relay 35 is energized by the circuit extending from line M1, through lines M12, M14, contact 36*a* closed and wires 148*a*, 148*b*. Due to closure of contact 35*a*, relay 35 is afterwards energized by the circuit extending from positive terminal + through cam-contact C2, line M24, contact 35*a*, wire 148*b*, relay coil 35 to negative terminal —, until point 15 of the cycle B5.

When, at point 13.5 of the cycle B5, contact 18*bc* returns to normal position, the following circuit is completed: from positive terminal +, cam-contact C2, line M24, contact 28*a* closed, contact 18*bc* normal, wire 145, contact 35*bc* transferred, wire 149, plug-socket F, plug-wire 345 (Figs. 3*a* and 6) plug-socket 338, relay coil SR3 to negative terminal —, energizing the relay. At the time of the pulse of cycle end produced by the closure of cam-contact C12, the contact SR3 is transferred and completes the circuit: positive terminal + (Fig. 6), wire 316, cam-contact C12, contact 307*b* closed, plug-socket S2, plug-wire 326, contact SR3*a* transferred, plug-wire 328, plug-socket E3, relay coils 308 and 309 to negative terminal —, energizing the 1st part relay of cycle C. In this manner, a recording cycle or cycle C is initiated, in the course of which the result 260,764 will be printed on the paper sheet in the machine. This cycle will be followed, in the manner previously stated, by a cycle D, in the course of which, all the accumulators and registers will be reset.

Another set of factors, for instance a multiplicand 938 and a multiplier 222, will be used to briefly explain the operation of the multiplication devices when one or several binary components is or are not present in the digits of the registered multiplier.

From the foregoing, it is easily understandable that the operation now requires four cycles B, one to double the multiplicand amount, and three to repeatedly transfer the multiple 2 of the multiplicand with proper shifts.

The factors are registered during a cycle A. Near the end of the cycle, the pulse resulting from the closure of cam-contact C6 (Fig. 3*a*) is delivered, not only to relay 140, but also on two branch circuits. The first branch circuit continues from wire 125*c*, through contact 140*b* closed, wire 150*a*, contact 35*bc* normal, wire 145, contact 18*bc* normal, relay coils 28 and 132 to negative terminal —, energizing the relays. The useful effect is to close contact 28*c*. The second branch circuit continues from wire 125*c*, through contact 140*b* closed, wires 150*b*, 150*c*, contacts R6*cd*—R9*cd* and branch circuits which energize relays 91, 92, 93 and 94. As the sensing of the multiplier digits reveals that there is no odd digit, relays R6—R9 remain deenergized.

The momentary energization of holding relays 91—94 is of no consequence because the operation of any relay group of the transfer control device cannot be initiated by the energization of these relays.

The closure of contact 28*c* permits the completion of the circuit: terminal + (Fig. 3*a*, left hand corner), cam-contact C7, wire 143, contact 28*c* closed, wires 17, 17*a* (Figs. 3*a* and 3*b*), contact R6*ab* normal, wire 15, contact R7*ab* normal, wire 29, contact R8*ab* normal, wire 30, contact R9*ab* normal, wires 105, 105*a*, 105*b* (Figs. 3*b* and 3*a*), contact 37*bc* normal, contact 35*d* normally closed, wire 102, relay coil 16, to negative terminal —, energizing the relay. Thus the operation of the doubling control device is initiated. Consequently during the cycle B1 which constitutes the chief part of the phase I, the amount 938 is double in MD to yield the amount 1876. There is no transfer from accumulator MD to accumulator TP since none of the relays 211–214, controlling the column-shift arrangement, is energized.

The phase II follows and comprises the cycles B2, B3 and B4 in the course of which the successive amounts 1876, 18,760 and 187,600 are respectively entered into the accumulator TP.

During the first part of the cycle B4, that is the last of the phase II, the doubling control device is operative to control the doubling of the amount in accumulator MD.

Thus the holding relay 28 is energized from point 11 to point 15 of cycle B4, moreover, the holding relay 33 is energized at the same time, as are also relays 53 and 43, to control the search for the component 4 in the multiplier digits. At points 11–12, the pre-sensing of the multiplier digits is effected to determine if components 4 or 8 are included in said digits. In order to search the component 8, the following circuit is completed: from positive terminal (Fig. 3*a*), wire 121, cam-contact C3, wires 135*a*, 135*b*, contact 28*b* closed, wires 27*a*, 27*c*, contact 54*cd* normal, wire 138, relay coil 44 to negative terminal —, energizing the relay. As contact 53*b* is opened, relays 42 and 41 cannot be energized through parallel circuits. Relay 37 is energized through wire 27*b*.

Although contacts 43*a*–*d* and 44*a*–*b* are closed, no energization circuit for detection relays R6—R9 can be completed since the multiplier does not contain the components 4 and 8.

Still at points 11–12 of the cycle B4, the following circuit is completed: from positive terminal +, cam-contact C4, wire 143, contact 28c closed, wires 17, 17a (Figs. 3a and 3b), the contacts and wires between points A3 and Z1, wires 105a, 105b (Figs. 3b and 3a), contact 37bc transferred, wire 144, relay coil 38, energizing the relay. The closure of contact 38a causes the energization of relay 35 which holds itself energized through its contact 35a, cam-contact C2 and line M24. When the contact 18bc returns to normal position, at point 13.5 of cycle B4, the same circuit as the one previously traced is completed to energize the selection relay SR3 (Fig. 6) and determine the end of the operation. It should be noted that the relay 35 may be energized either after pick-up relay 36 (normal end) or after pick-up relays 37—38 (premature end).

The new multiplication process used is advantageous in permitting the simultaneous multiplication of a multiplicand by a plurality of multipliers with a minimum of apparatus. Fig. 4 shows a block diagram constituting an alternative embodiment of the invention, for effecting the multiplication of one multiplicand by a multiplier split into two equal parts as the number of denominational orders is concerned. To this end, the changes necessary in the apparatus are very small. The entry and read-out circuits of the multiplier register undergo no change. The indications MR1 and MR2 (Fig. 4) have been set only to symbolize the two portions of the multiplier. The practical changes consist of: (1) The adaptation of the transfer control device by removing the two-prong connector 25b (Fig. 3b) which is replaced by a plug wire linking plug-sockets A1 and A2; (2) the use of two column-shift arrangements TD1 and TD2 (Fig. 4), and two product accumulators TP1 and TP2, with total transfer means from TP1 to TP2, adapted to control a shift equal to the number of denominational orders of each multiplier portion; (3) provision of double connections between the exit terminals S of the multiplicand accumulator and the column-shift arrangements.

It may be noted that, in any case, the read-out system of the multiplicand accumulator requires only one commutator per denominational order.

When the above changes are made, two multiplier digits may be active during one multiplication cycle subject to the condition that they both contain the binary component allotted to the active phase. As now two relay groups may be operative simultaneously in the transfer control device, that is one in each portion, the average number of necessary cycles is cut down by two, except, for example, for the further transfer cycle from TP1 to TP2.

When, eventually, two distinct multipliers are respectively registered in MR1 and MR2, the corresponding products are available in the product accumulators TP1 and TP2, and obviously, there is no need of a final transfer cycle from TP1 to TP2.

There will now be obvious to those skilled in the art many modifications and variations utilizing the principles set forth and realizing many or all of the objects and advantages of the circuits described but which do not depart essentially from the spirit of the invention.

What is claimed is:

1. In a cyclically operated accounting machine comprising a multiplier register, an accumulator for registering a multiplicand and means coupled to said accumulator for repeatedly doubling the amount said accumulator contains, a product accumulator, a transmitting arrangement with circuit paths to transfer an amount from said accumulator to said product accumulator, denominational order detection means coupled to said multiplier register, multiplication control means to control the execution of a multiplication in several multiplication phases, each phase being devoted to a different binary component used as partial multiplier, said multiplication control means being coupled to said multiplier register for causing, during each phase, said detection means to detect the denominational orders of the multiplier register wherein are registered digits containing the binary component corresponding to each phase for controlling, during each phase, the reading-out of the amount in the multiplicand accumulator a number of times equalling the number of orders detected, said doubling means being responsive to said multiplication control means for doubling the amount registered in said accumulator in accordance with the binary component to be inspected for and column shift means responsive to said denominational order detection means for shifting the amount registered in said accumulator in accordance with the denominational order of the digits of the multiplier when transferring said amount to the product accumulator.

2. In a cyclically operated accounting machine comprising a multiplier register, a phase selector device including cyclically operating elements successively operative for controlling the execution of a multiplication in several multiplication phases, each phase being related to a different binary component among 1, 2, 4, 8, detection means coupled to said multiplier register each element, when operative, causing said detection means to detect the denominational orders of digits in said multiplier register wherein are registered multiplier-digits containing the binary component corresponding to the multiplication phase a multiplicand accumulator for storing the multiplicand, a doubler responsive to said phase selector device for doubling the amount in said multiplicand accumulator in accordance with the phase in process, column-shift means, a product accumulator and a transfer control device comprising denominationally ordered elements functioning under control of said detection means, said transfer control device controlling, during each phase, the number of transfers of the amount in the multiplicand accumulator to said product accumulator through said column-shift means, the number of transfers equalling the number of orders detected, the amount transferred being shifted by said column shift means in accordance with the denominational order of the digit causing the transfer.

3. The apparatus claimed in claim 2 in which the elements of the transfer control device are interconnected so that the elements corresponding to the orders detected during one phase are set into activity one after another during successive transfer cycles constituting said phase.

4. In a cyclically operated accounting machine comprising a multiplier register, an accumulator adapted to register a multiplicand, means for repeatedly doubling the amount said accumulator contains, a product accumulator, column-shift means with circuit paths to transfer an amount from said accumulator to said product accumulator, denominational order detection means associated with said multiplier register, a phase selector device including cyclically operating elements successively operative for controlling the execution of a multiplication in several phases, each phase being related to a different binary component from 1 to 8, each element, when operative, causing said detection means to detect the denominational orders of the multiplier register wherein are registered multiplier digits containing the component corresponding to the phases in progress, a transfer control device comprising denominationally ordered elements under control of said detection means, said transfer control device controlling, during each phase, a number of successive transfers of the amount in said multiplicand accumulator to said product accumulator, said number equalling the numbers of orders detected said column shift means being responsive to said detection means for shifting the amount transferred to said product accumulator in accordance with denominational order of the digit of the multiplier causing the transfer.

5. The apparatus claimed in claim 4, wherein are provided a doubling control device and determination circuits for determining, during each phase, when the last element of said transfer control device corresponding to the orders detected is to be set into activity, said determination circuits actuating said doubling control device so that the amount in said multiplicand accumulator is doubled during the last transfer cycle of the phase.

6. The apparatus claimed in claim 4 in which are provided a doubling control device and determination circuits to determine, during each phase, when the last element of said transfer control device is to be set into activity, said determination circuits actuating said doubling control device so that the amount in said multiplicand accumulator is doubled during the last transfer cycle of the phase, and wherein the doubling control device controls said phase selector device so that, after the last transfer cycle of a phase, said phase selector device starts another multiplication phase.

7. The apparatus claimed in claim 4 in which are provided a doubling control device and determination circuits associated with said detection means to determine whether an order is detected during a phase, said determination circuits actuating said doubling control device when no order is detected so that the amount in said multiplicand accumulator is doubled during a cycle of the related phase although no element is operative in said transfer control device to transfer an amount from said multiplicand accumulator to said product accumulator.

8. The apparatus claimed in claim 4, wherein are provided: a doubling control device, determination circuits for determining during each phase, when the last element of said transfer control device is to be set into activity during a phase for causing said doubling control device to double the amount in the multiplicand accumulator during the last transfer cycle of the phase, an end determination device, and initiating means under control of the doubling control device to control said detection means to detect that there are no digits in said multiplier register containing components greater than the binary components being inspected for during a phase, said end determination device being operative, when there are no greater binary components, and a cycle controller responsive to said end determination device to stop the succession of multiplication cycles.

9. In a cyclically operated accounting machine comprising a multiplier register, an accumulator for registering a multiplicand, means for repeatedly doubling the amount said accumulator contains, a product accumulator, a transmitting arrangement with column shift control means to transfer an amount from the multiplicand accumulator to said product accumulator, a multiplication phase controller to control the execution of successive phases, each phase being characterized by the use of one term of the progression 1, 2, 4, 8 as partial multiplier, a manifesting device associated with the multiplier register to manifest, under control of said phase controller, the presence in the multiplier digits of a binary component, said manifesting device indicating at which denominational order the binary component is present, said transfer control device denominational coordinated to said manifesting device to control, during each phase, the number of transfers of the amount in the multiplicand accumulator to the product accumulator, said number being equal to the number of denominational orders in which the binary component is detected, said column-shift means being interposed between said multiplicand accumulator and said product accumulator to shift the amount transferred to said product accumulator in accordance with the denominational order in which each binary component is detected, control means governed by said transfer control device to control at said end of each phase, the doubling of the amount in the multiplicand accumulator and the initiation of the following phase by said phase controller.

10. In a cyclically operated accounting machine comprising a multiplier register, an accumulator for registering a multiplicand, means for repeatedly doubling the amount said accumulator contains, a product accumulator column-shift means coupled between said multiplicand accumulator and said product accumulator multiplier sensing relay means, denominational order detection relays associated through the multiplier register with said multiplier sensing relay means, a phase selector device including cyclically operating relay groups successively operative for controlling the execution of a multiplication in several phases, each phase being devoted to a different binary component from 1 to 8, each relay group, when operative, causing said sensing relay means and detection relays to detect the denominational orders of the multiplier register wherein are registered multiplier digits containing the component corresponding to the active phase, a transfer control device comprising denominationally ordered transfer control device groups under control of said detection relays, said relay being automatically operative for controlling during each phase, a number of successive transfers of the amount in the multiplicand accumulator to the product accumulator, said number equalling the number of the orders detected, control circuits governed by the transfer control device to control at the end of each phase the doubling of the amount in the multiplicand accumulator and the initiation of the following phase.

11. A calculator comprising a multiplicand register for receiving a multiplicand, a multiplier register for storing a multiplier, a product register, column shift means coupling said multiplicand register to said product register, a phase selector for controlling a multiplication to be performed in successive phases, each of the phases corresponding to one of a number of binary components, detecting means for inspecting the multiplier and detecting which of the digits of the multiplier include a specific one of the binary components during the corresponding one of the phases, doubling means responsive to the phase selector for doubling the amount in the multiplicand register for each successive phase, said detecting means controlling said multiplicand register to transfer the amount contained via said column shift means to said product register in response to the detection of a binary component in a multiplier digit in the corresponding phase, and indicating means for indicating the denominational order of the multiplier digit in which the binary component is detected to control said column shifting means to shift the amount transferred to said product register in accordance with the denominational order of the multiplier digit in which the binary component is detected.

References Cited in the file of this patent

UNITED STATES PATENTS

| | | |
|---|---|---|
| 2,192,599 | Lang | Mar. 5, 1940 |
| 2,213,565 | Lang et al. | Sept. 3, 1940 |
| 2,344,885 | Kozma et al. | Mar. 21, 1944 |
| 2,419,502 | Saxby | Apr. 22, 1947 |

FOREIGN PATENTS

| | | |
|---|---|---|
| 484,150 | Great Britain | Apr. 27, 1938 |